Patented Dec. 31, 1946

2,413,582

UNITED STATES PATENT OFFICE 2,413,582

SILICO-ORGANIC DERIVATIVES AND PROCESS OF MAKING THE SAME

John B. Rust, West Orange, and Charles A. MacKenzie, Montclair, N. J., assignors, by direct and mesne assignments, of one-half to Montclair Research Corporation, a corporation of New Jersey, and one-half to Ellis-Foster Company, a corporation of New Jersey No Drawing. Application December 29, 1943, Serial No. 516,123

2 Claims. (Cl. 260—607)

The present invention relates to organic silicon derivatives containing hydrocarbon groups, particularly groups such as aliphatic, carbocyclic and alicyclic groups, to processes of making such products, and compositions containing the same.

Heretofore alkyl and aryl silicon derivatives have been made primarily by the action of alkyl- or aryl-magnesium halides on silicon halides or ethyl orthosilicate. It has also been reported that certain other metal alkyls such as zinc and mercury alkyls could be employed. In using the alkyl- or aryl-magnesium halide, relatively large amounts of ethyl ether were preferably employed and the process had to be carried out in at least two steps, namely: (1) preparation of the Grignard reagent, and (2) reaction of the silicon halide or ethoxide with the Grignard reagent.

Among the objects of the present invention is the production of carbon-silicon bonded materials produced by economic and simple methods.

Other objects include the production of silicon derivatives such as silicon plastics, lacquers and resins in good yield and by readily controllable, inexpensive processes.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

In accordance with the present invention it has been found possible to act upon a mixture of an organic halide, particularly a hydrocarbon halide such as alkyl halide or aryl halide and silicon halide with lithium metal and form the desired reaction products in one step.

Furthermore, it has been found that a solvent may or may not be employed in the reaction or if desired, a solvent may be added at the end of the reaction to dilute the reaction mixture. When a solvent is employed, it may be an ether, a hydrocarbon such as an aromatic, aliphatic or alicyclic hydrocarbon, an ester, a ketone, and the like.

The products made by the process of the present invention in some cases are complex mixtures, especially so where no solvent is used during the reaction. It is thought to be possible that some Si-Si linkages have been formed as well as C-Si linkages. This, however, is speculation and we do not wish to be limited by theory. However, in some cases the products of the present invention do not resemble those using the same ingredients but made by the two-step Grignard reaction.

The products of this invention may be hydrolyzed in water and by subsequent heating be converted into hard, tough plastic materials. On the other hand, the hydrolytic products may be dissolved in suitable solvents and used as baking lacquer materials. Other uses will appear hereinafter and in our copending applications.

The following example is given to illustrate the process of the present invention and the products obtainable therefrom. All proportions are in parts by weight.

100 parts of diethyl ether, 3.47 parts of metallic lithium and 2.6 parts of n-butyl bromide were placed in a reaction vessel equipped with a stirrer, a reflux condenser and a dropping funnel. A reaction began, as was evidenced by heat being evolved. A mixture consisting of 42.5 parts of silicon tetrachloride and 38.6 parts of n-butyl bromide was added slowly. Heat was applied and the solution refluxed at boiling for 5 hours. The mixture was then allowed to stand overnight. All of the lithium metal had entered into reaction. The mixture was filtered, the salts washed with ether and the combined filtrate poured on crushed ice to hydrolyze the alkyl silicon chlorides. The other solution was washed and a film was cast on a glass surface. On baking at 140° C. for 3 hours a hard, brittle organo-silicon resinous film was obtained. On evaporation of the ether from the main mass of solution a viscous liquid was obtained. This liquid slowly hardened on being heated at 140° C., first turning into a rubbery infusible, insoluble gel and then into a hard glassy resin.

In the above example, the organic halide and the silicon halide were used in each case in approximately a molar ratio of 1:1. The proportions of the reaction ingredients may be varied substantially and may, for example, vary from less than one mol of organic halide to four mols of organic halide based on one mol of silicon halide. When less than 1 mol of organic halide is used to 1 mol of silicon halide, there will be a mixture of free silicon halide and mono alkyl silicon halide. When this is hydrolyzed and polymerized a mixed alkyl silicon oxide and silicon oxide polymer results.

The silicon products, prepared according to the above descriptions, may be preserved for future use by placing them in solvents. A large variety of solvents may be employed, including hydrocarbon solvents both aliphatic and aromatic, such as hexane, benzene, toluene, etc.; ethers such as dimethyl, diethyl, diisopropyl, dibutyl ethers or mixed ethers; esters such as ethyl, butyl or amyl acetates; alcohols, etc. When the use of a storage solvent is desired, it is sometimes advantageous to add the solvent to the reaction mixture before it is poured on ice to hydrolyze it.

Another type of resinous material may be obtained by adding a moist alcohol to the reaction products before pouring them on ice. In such instances the alkoxy group partially replaces chlorine on the silicon.

Besides moist ethanol, other moist alcohols individually or in admixture may be employed such as the aliphatic alcohols including methanol, propanol, butanol, phenols such as phenol, cycloaromatic or alicyclic alcohols such as cyclohexanol, and the like. Anhydrous alcohols, etc., may also be used and the products converted into the silicon alkoxy, aryloxy, or cycloaryloxy corresponding derivatives. These materials generally are viscous oils and may be used as such for a variety of uses or water may be added to them and hydrolysis allowed to occur.

As the hydrocarbon substituents attached to the silicon there may be used alkyl, aryl, olefinyl, alkenyl, alkynyl, arenyl, arynyl, alicyclic, cycloaromatic, aralkyl, derivatives as illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl, and radicals from such derivatives as phenyl acetylene, etc.

The silicon halide is desirably the tetrahalide such as silicon tetrachloride, silicon tetrabromide, and silicon tetraiodide, but other derivatives can be used, such as disilicon hexahalides, trisilicon octahalides, polysilicon polyhalides, silicon oxychlorides, and the like.

The materials made by the process of the present invention may be used for a large number of applications. For instance, as pointed out above, the substituted silicon chlorides may be reacted with hydroxy compounds or they may be hydrolyzed and used in a solvent.

The hydrolyzed or partially hydrolyzed or etherified materials may be used as lacquers or adhesives, either alone or in admixture with other completely reacted or potentially reactive resins. Such resins include natural resins such as rosin, copal, shellac, etc., as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives including the esters of acrylic and methacrylic acids, etc.

The silicon derivatives of the present invention as illustrated above may be used as textile finishing compositions either alone, or in solution in solvents to produce special effects such as waterproofing, creaseproofing, wrinkleproofing, etc.

The silicon derivatives either alone or in admixture with other additives including resins as set forth above, may be mixed with various inorganic or organic fillers and used for hot molding, extruding, casting, etc. Objects having excellent strength and highly resistant to water and organic solvents may be produced. The inorganic fillers include both fibrous and non-fibrous materials such as the clays like bentonite, mica, asbestos, glass, or cellulosic materials such as paper, cotton, wood flour, etc.

The silicon derivatives prepared in accordance with the present invention may be used as lubricating oils or may be used as additives to both hydrocarbon oils such as lubricating oils and also for inclusion with vegetable oils, particularly the drying oils such as linseed oil, and China-wood oil, and the semi-drying oils such as soya bean oil, etc., as well as non-drying oils including castor oil, etc. Thus the silicon derivatives may be blended or cooked with the vegetable oils.

In view of their excellent electrical properties, the derivatives may be used either per se or as varnishes, etc., in producing coatings or articles, or coated articles for electrical insulation, etc. These silicon derivatives may also be used in the production of laminated products for bonding together two or more sheets of the same or different organic or inorganic materials.

The silicon derivatives are also utilizable as plasticizers as well as binders, and their utilization for such purposes may be controlled by the number of alkyl or aryl or similar substituents introduced into the derivative.

Having thus set forth our invention, we claim:

1. Process of making alkyl silicon derivative in which the alkyl group contains from one to eight carbon atoms comprising reacting silicon tetrahalide selected from the group consisting of chloride, bromide and iodide with an alkyl halide selected from the group consisting of chloride, bromide and iodide, in which the alkyl group contains from one to eight carbon atoms, concurrently in the presence of metallic lithium while at a temperature at which refluxing takes place, in proportions to produce a hydrolyzable alkyl silicon halide.

2. Process of making alkyl silicon derivatives comprising reacting a mixture of n-butyl bromide and silicon tetrachloride in the proportions of approximately 1:1 with metallic lithium in the presence of an ether solvent at a temperature at which refluxing takes place to form butyl silicon chloride.

JOHN B. RUST.
CHARLES A. MacKENZIE.